(12) United States Patent
Allen et al.

(10) Patent No.: US 8,019,878 B1
(45) Date of Patent: Sep. 13, 2011

(54) SYSTEM AND METHOD FOR TWO WAY COMMUNICATION AND CONTROLLING CONTENT IN A WEB BROWSER

(75) Inventors: Christopher Allen, Jamaica Plain, MA (US); Trevor Burton, Barrow-On-Humber (GB); Andrew Zupko, Huntsville, AL (US)

(73) Assignee: Brass Monkey, Inc., Jamaica Plain, MA (US)

( * ) Notice: Subject to any disclaimer, the term of this patent is extended or adjusted under 35 U.S.C. 154(b) by 0 days.

(21) Appl. No.: 13/041,313

(22) Filed: Mar. 4, 2011

Related U.S. Application Data (60) Provisional application No. 61/311,102, filed on Mar. 5, 2010, provisional application No. 61/421,977, filed on Dec. 10, 2010.

(51) Int. Cl.
*G06F 15/16* (2006.01)
(52) U.S. Cl. ........................ 709/227; 709/205
(58) Field of Classification Search ............... 709/227, 709/205
See application file for complete search history.

(56) References Cited

U.S. PATENT DOCUMENTS

| | | | |
|---|---|---|---|
| 6,678,246 B1 | 1/2004 | Smyth | |
| 7,143,137 B2 | 11/2006 | Maufer et al. | |
| 7,292,588 B2 | 11/2007 | Milley et al. | |
| 7,349,967 B2 * | 3/2008 | Wang | 709/227 |
| 7,493,383 B1 | 2/2009 | Mukerji | |
| 7,664,096 B2 | 2/2010 | Doherty et al. | |
| 7,706,401 B2 * | 4/2010 | Bae et al. | 370/466 |
| 7,797,417 B2 | 9/2010 | Choi | |
| 7,818,788 B2 | 10/2010 | Meier | |
| 7,828,654 B2 | 11/2010 | Carter | |
| 7,865,573 B2 | 1/2011 | Tyhurst et al. | |
| 7,890,957 B2 | 2/2011 | Campbell | |
| 2001/0032265 A1 | 10/2001 | Tanaka | |
| 2002/0091831 A1 | 7/2002 | Johnson | |
| 2002/0151327 A1 | 10/2002 | Levitt | |
| 2003/0001883 A1 | 1/2003 | Wang | |
| 2003/0046374 A1 | 3/2003 | Hilt et al. | |
| 2004/0205245 A1 * | 10/2004 | Le Pennec et al. | 709/245 |
| 2005/0003824 A1 | 1/2005 | Siris | |
| 2005/0015584 A1 * | 1/2005 | Takechi et al. | 713/151 |

(Continued)

FOREIGN PATENT DOCUMENTS

EP 1335535 8/2003

(Continued)

OTHER PUBLICATIONS

Office Action in U.S. Appl. No. 13/041,951 mailed Jun. 2, 2011.

(Continued)

*Primary Examiner* — Kyung H Shin
(74) *Attorney, Agent, or Firm* — Greenberg Traurig, LLP; Chinh H. Pham; Seth A. Milman (57) ABSTRACT

A system and method for connected devices over a network includes: receiving, by an address registration server, a communication from a host device and a communication from an endpoint device; determining whether the host device and the endpoint device are connected to a single local network and whether the host device and the endpoint device are each executing a compatible application; and facilitating a network connection between the endpoint device and the host device over the local network by providing a private network address of the endpoint device to the host device.

18 Claims, 4 Drawing Sheets

U.S. PATENT DOCUMENTS

| | | |
|---|---|---|
| 2005/0138460 A1 | 6/2005 | McCain |
| 2005/0261815 A1 | 11/2005 | Cowelchuk et al. |
| 2005/0267935 A1 | 12/2005 | Gandhi et al. |
| 2006/0039356 A1 | 2/2006 | Rao et al. |
| 2006/0117107 A1 | 6/2006 | Shafron et al. |
| 2006/0152752 A1 | 7/2006 | Yamaguchi et al. |
| 2006/0267936 A1 | 11/2006 | Hoerl et al. |
| 2006/0291434 A1 | 12/2006 | Gu et al. |
| 2007/0058642 A1* | 3/2007 | Eisink ............................ 370/401 |
| 2007/0088851 A1 | 4/2007 | Levkovitz et al. |
| 2007/0088852 A1 | 4/2007 | Levkovitz |
| 2007/0100514 A1 | 5/2007 | Park |
| 2007/0198144 A1 | 8/2007 | Norris et al. |
| 2008/0167732 A1 | 7/2008 | Slavin et al. |
| 2008/0183307 A1 | 7/2008 | Clayton et al. |
| 2008/0229095 A1 | 9/2008 | Kalimuthu |
| 2008/0261686 A1 | 10/2008 | Bedingfield |
| 2008/0291916 A1 | 11/2008 | Xiong et al. |
| 2008/0312782 A1 | 12/2008 | Berdichevsky et al. |
| 2009/0055749 A1 | 2/2009 | Chatterjee et al. |
| 2009/0060452 A1 | 3/2009 | Chaudhri |
| 2009/0062014 A1 | 3/2009 | Gift et al. |
| 2009/0135765 A1 | 5/2009 | Lewis et al. |
| 2009/0153289 A1 | 6/2009 | Hope et al. |
| 2009/0199259 A1 | 8/2009 | Alao et al. |
| 2009/0199275 A1 | 8/2009 | Brock et al. |
| 2009/0248542 A1 | 10/2009 | Houvener et al. |
| 2009/0300137 A1 | 12/2009 | Tyhurst et al. |
| 2009/0319644 A1 | 12/2009 | Fagioli et al. |
| 2010/0023338 A1 | 1/2010 | Petronelli et al. |
| 2010/0184422 A1 | 7/2010 | Ahrens |
| 2010/0267448 A1 | 10/2010 | Snoddy et al. |
| 2010/0299436 A1 | 11/2010 | Khalid et al. |
| 2011/0009193 A1 | 1/2011 | Bond et al. |

FOREIGN PATENT DOCUMENTS

| | | |
|---|---|---|
| WO | WO 2009/055717 | 4/2009 |
| WO | WO 2010/062617 | 6/2010 |
| WO | WO2010/0088313 | 8/2010 |
| WO | WO 2010/093831 | 8/2010 |
| WO | WO 2010/112839 | 10/2010 |

OTHER PUBLICATIONS

Office Action in U.S. Appl. No. 13/042,286 mailed Jun. 10, 2011.
Schulzrinne, H., et al., "Real Time Streaming Protocol (RTSP)", Network Working Group, pp. 1-92, (Apr. 1998).
PCT International Search Report based on International Application No. PCT/US2011/027431 dated Apr. 28, 2011.
PCT International Search Report based on International Application No. PCT/US2011/027429 dated Apr. 29, 2011.
PCT International Search Report based on International Application No. PCT/US2011/027294 dated May 6, 2011.
PCT International Search Report based on International Application No. PCT/US2011/027295 dated May 9, 2011.

* cited by examiner

SYSTEM AND METHOD FOR TWO WAY COMMUNICATION AND CONTROLLING CONTENT IN A WEB BROWSER

CROSS-REFERENCE TO RELATED APPLICATIONS

This application claims priority to and benefit of Provisional Patent Application Ser. No. 61/311,102, filed on Mar. 5, 2010, and to Provisional Patent Application Ser. No. 61/421,977, filed on Dec. 10, 2010. Both applications 61/311, 102 and 61/421,977 are incorporated herein by reference in their entirety.

TECHNICAL FIELD

This invention relates generally to the field of communication over a network, and more particularly, to communicating over a network to control content displayed in browser application running within a web browser, and establishing two-way communication between the browser application and a remote application.

BACKGROUND

With the rise of mobile computing, more and more devices are able to connect to computer networks. Network communication is no longer limited to PCs and laptops. Mobile phones and smart phones can typically connect not only to mobile telephone networks, but also Wi-fi networks, Bluetooth® networks, USB networks, etc. Other devices, which historically were not able to connect to computer networks, are entering the market already configured to access the internet. Televisions, DVD players, and even home appliances have network and internet capability.

Mobile applications have also become increasingly popular. Smart phones, such as the iPhone® device, Android® phones, or Blackberry® phones can download and run a broad array of different applications, from games and movie players to productivity and work tools.

Browser applications are attractive to developers because they can be relatively easy to develop and deploy. Browser applications also provide dynamic and customizable content for display within a web browser. A browser application developer could create, for example, a video game or media presentation application that can run within a web browser.

Browser applications, such as FLASH® applications, Unity™ applications, JavaScript® applications, and the like, can be downloaded and run by a web browser without the need to install the application directly onto a local computer. Rather, a user can run a browser application simply by directing his or her browser to a URL that provides a browser application. The web browser will then load and execute the browser application directly, downloading it just as if the user were viewing a static web page.

However, browser applications are typically subject to security restrictions. Web browsers often employ a security scheme, sometimes called sandbox security, that restricts browser applications from accessing resources on the local machine. For example, web browsers will often prevent browser applications from accessing files on the local hard drive, operating system resources, etc. Web browsers may also prevent browser applications from communicating over a network, such as a local or wide area network connected to the local machine.

Unfortunately, because of a the security mechanisms of a web browser, it may be difficult for a mobile device or mobile application to connect to and communicate with a browser application running within a web browser.

BRIEF SUMMARY OF THE INVENTION

The system and method includes apparatuses and operations for receiving, by an address registration server, a communication from a host device including a public network address of the host device, and a communication from an endpoint device including a public network address and a private network address of the endpoint device. The system and method also may determine, whether the host device and the endpoint device are connected to a single local network based on the public network addresses of the host device and a public address of the endpoint device, and whether the host device and the endpoint device are each executing a compatible application. The system and method may also facilitate a network connection between the endpoint device and the host device over the local network by providing the private network address of the endpoint device to the host device if it is determined that the endpoint device and the host device are connected to the local network and each executing a compatible application.

In various embodiments, the communication from the host device and the communication from the endpoint device each include an application ID configured to identify an application running on the endpoint device, the host device, or both. The determination regarding whether the endpoint device and the host device are each executing the compatible application may be based upon a comparison of the application ID received from the host device and the application ID received from the endpoint device.

In embodiments, the host device may execute a browser application within a web browser, and the endpoint device may executing an application configured to control content in the browser application. Determining whether the endpoint device and the host device are each executing the compatible application may be based upon whether the browser application and the application configured to control content in a browser application are compatible applications. The browser application may be, for example, game application and the application configured to control the content may be a game controller application.

The system and method may also modify a security policy of the web browser to allow communication between the browser application and the application configured to control content in the browser application.

DETAILED DESCRIPTION OF THE EMBODIMENTS

The present invention may provide a system and method for connecting devices over a network. More particularly, the present invention may be used to connect and facilitate communication between a browser application running within a web browser and an application executing on an endpoint device.

Web browsers often employ security schemes, sometimes referred to as sandbox security, to ensure that browser applications cannot cause harm to a local machine. These security schemes may restrict a browser application from using local machine resources, such as the hard drive of the computer computer, I/O, or networking capabilities.

Typically, devices on a network can discover other devices on the network by broadcasting their presence on the network, and monitoring broadcasts from other devices. However, if a browser application, for example a FLASH application, is running within a web browser on a machine connected to a network, the security mechanisms of the web browser may prevent the browser application from discovering or communicating with other device connected to the network, even if those other devices are running applications that could otherwise communicate or interact with the browser application.

System Architecture

Figure 1:
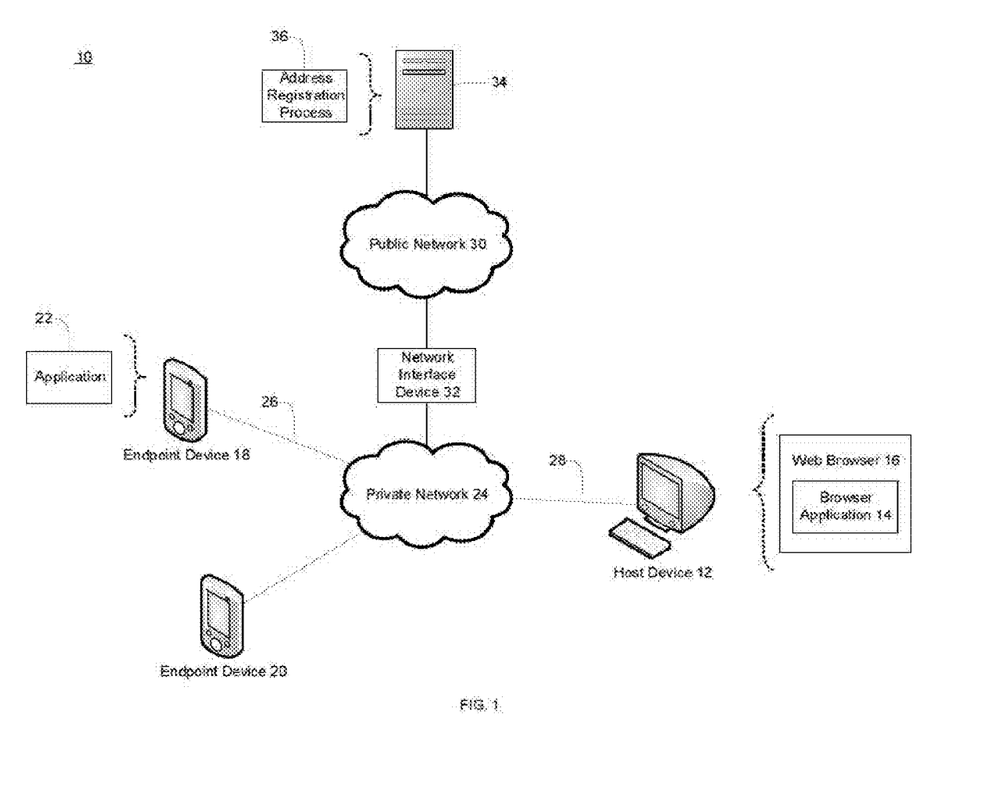
FIG. 1 is a block diagram of an exemplary computer network architecture suitable for operation of the present invention.

Referring now to FIG. 1, in an embodiment, the present invention provides a system and architecture 10 for controlling content within a web browser. The system may include host device 12, which may execute browser application 14 within web browser 16.

FIG. 1 shows host device 12 as a desktop computer, however host device 12 is not limited to desktop computers. For example, host device 12 may be a laptop computer, server computer, game console, mobile device, smart phone, internet television, home appliance, network- and processor-enabled remote control toy, internet enabled billboard, medical display device, iPad®, or any other device capable of running browser application 14 within web browser 16.

FIG. 1 also shows endpoint devices 18, 20. Endpoint device 18 may execute application 22, which may be an application configured to communicate with browser application 14. Endpoint device may typically be a network-enabled wireless handheld device, such as a PDA or smart phone, and application 22 is typically a mobile application. However, endpoint device may also be any type of device capable of running application 22 and connecting to private network 24, such as a laptop or desktop computer, a gaming console, a game controller, etc.

Endpoint device 20 may be another endpoint device within system 10. Endpoint device 20 is depicted here merely to show that other devices may be included within system 10 and connected to private network 24. Although not shown, endpoint device 20 may execute an application such as application 20, may execute other applications capable of communicating with browser application 14, or may execute applications capable of communicating with other browser applications, for example.

Host device 12 and endpoint devices 18, 20 may be connected to private network 18. Private network 18 can typically be a local are network (LAN), but may also be other types of networks, including but not limited to, a wired LAN, one or more LAN segments, a wireless LAN, a wide area network, a Bluetooth® network, a USB network, etc. Accordingly, connections 26, 28 may be wired or wireless connections and may employ any appropriate communication technologies and protocols to enable communication between the devices.

Private network 24 may also comprise multiple networks coupled together, multiple LAN segments, etc. For the sake of simplicity, this disclosure will describe private network 24 as a wired/wireless Ethernet LAN, typical of internet enabled households and businesses. Wired/wireless routers, such as those provided by Linksys® and other companies, can provide such a network. However, one skilled in the art will recognize that the inventions herein may operate within various different types of network topologies.

Private network 24 is shown as separated from public network 30 by network interface device 32. Public network 30 may be any type of LAN or WAN. In this example, public network 30 may represent a public network such as the internet.

Network interface device 32 may provide a bridge between private network 24 and public network 30, and also may provide a security barrier between private network 24 and the internet, such as a firewall. Typical examples of network interface device 32 are cable modems, DSL modems, T1 connections, and the like. Devices connected to public network 30 (i.e. the internet) typically cannot penetrate the security barrier of network interface device 32 to discover or communicate with devices on private network 32. However, in an embodiment, network interface device 32 may allow devices on private network 24 to access public network 30 so that they can browse the internet, download applications, and communicate with devices on the internet. Network interface device 32 may be a single network interface device, or may be multiple network interface devices that provide multiple access points between private network 24 and the internet.

Devices connected to private network 24 may receive a private network address, while devices connected to public network 30 may receive public network addresses. A private network address is an address specific to private network 24. Devices that receive a private network address from private network 24 can typically communicate freely with other devices on private network 24. However, devices on public network 30 typically cannot discover or communicate with devices on private network 24 having private network addresses because of the security mechanisms in network interface device 32. A typical example is a home or business LAN, where devices on the LAN can communicate with each other, and can access the internet, but devices on the internet cannot discover or initiate communications with the devices on the LAN.

Since network interface device 32 is connected to public network 30, network interface device may receive a public network address. A public network address is an address that can be accessed by devices on public network 30 and/or private network 24. Since, in this example, public network 30 represents the internet, the public network address received by network interface device is a public internes address, which can be accessed by other devices on the internet. The opposite may also be true.

In other words, devices on public network 30 (i.e. internes devices) can "see" network interface device 32 and its public network address, but they cannot "see" devices on private network 24. Devices on private network 24 can not only "see" the other devices on private network 24 and access them using their private network addresses, they can also "see" devices on public network 30 and access them using their public network addresses.

FIG. 1 also shows server 34, which is executing address registration process 36. Server 34 can be any type of computing device or group of devices capable of executing address registration process 36. Typically, server 34 is a server computer, an internet server, a group of servers, a cluster of servers, or any configuration of server computers.

System 10 shows a typical configuration for the inventions described herein. However, system 10 is not the only architecture within which the inventions described herein can operation. One skilled in the art will recognize that various system architectures can support the systems, methods, and apparatuses described herein. Also, although not shown, any of the applications and processes may be run by any computing device within system 10, or by any computing device capable or running the applications and processes. For example, host device 12 may execute address registration process 36 and/or application 22; endpoint devices 18, 20 may execute web browser 16, browser application 14, and or address registration process 36; and server 34 may execute web browser 16, browser application 14, and/or application 22.

As discussed, since browser application 14 is running within the security scheme of web browser 16, browser application 14 may not be able to discover or communicate with application 22, and application 22 may not be able to discover or communicate with browser application 14.

Computer Processing Device

Figure 2:
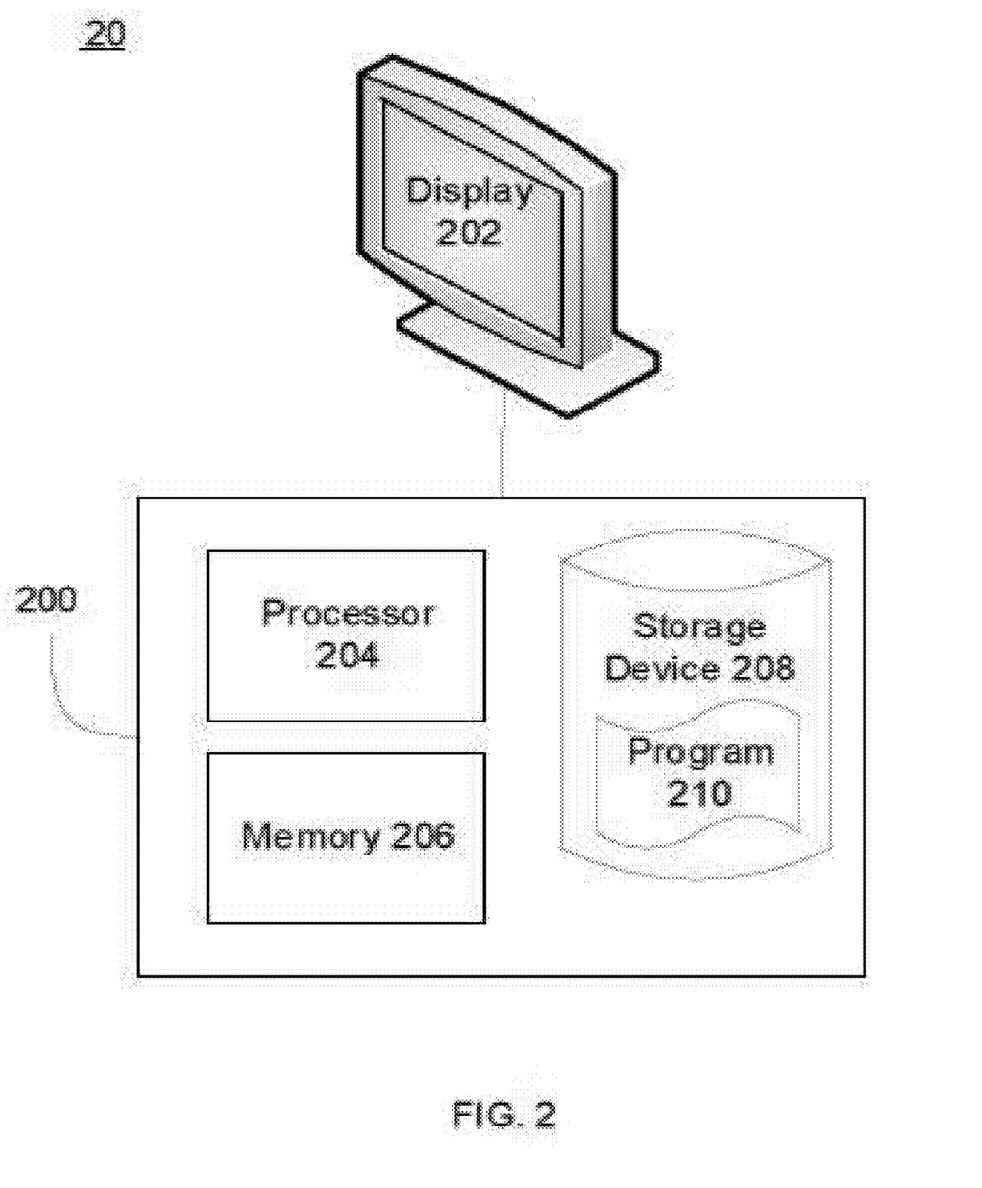
FIG. 2 is a block diagram of a computer processing device.

The present inventions may be implemented as hardware, software, or a combination of hardware and software. FIG. 2 shows a block diagram of a typical processing architecture, which may execute software applications and processes. Computer processing device 200 is coupled to display 202 for graphical output. Processor 204 is a computer processor capable of executing software. Typical examples are computer processors (such as Intel® or AMD® processors), ASICs, microprocessors, and the like. Processor 204 is coupled to memory 206, which is typically a volatile RAM memory for storing instructions and data while processor 204 executes. Processor 204 is also coupled to storage device 208, which is a non-volatile storage medium, such as a hard drive, FLASH drive, tape drive, DVDROM, or similar device. Program 210 is a computer program containing instructions and/ or data, and is stored on storage device 208. In a typical scenario, processor 204 may load some or all of the instructions and/or data of program 210 into memory 206 for execution. Program 210 can be any computer program or process including, but not limited to web browser 16, browser application 14, address registration process 36, application 22, or any other computer application or process.

Program 210 may include various instructions and subroutines, which, when loaded into memory 206 and executed by processor 204 cause processor 204 to perform various operations, some or all of which may effectuate the methods associated with the present inventions.

Although not shown, computer processing device 200 typically includes various forms of input and output. The I/O may include network adapters, USB adapters, Bluetooth radios, mice, keyboards, touchpads, displays, touch screens, LEDs, vibration devices, speakers, microphones, sensors, or any other input or output device for use with computer processing device 200.

Content Control Process

Figure 3:
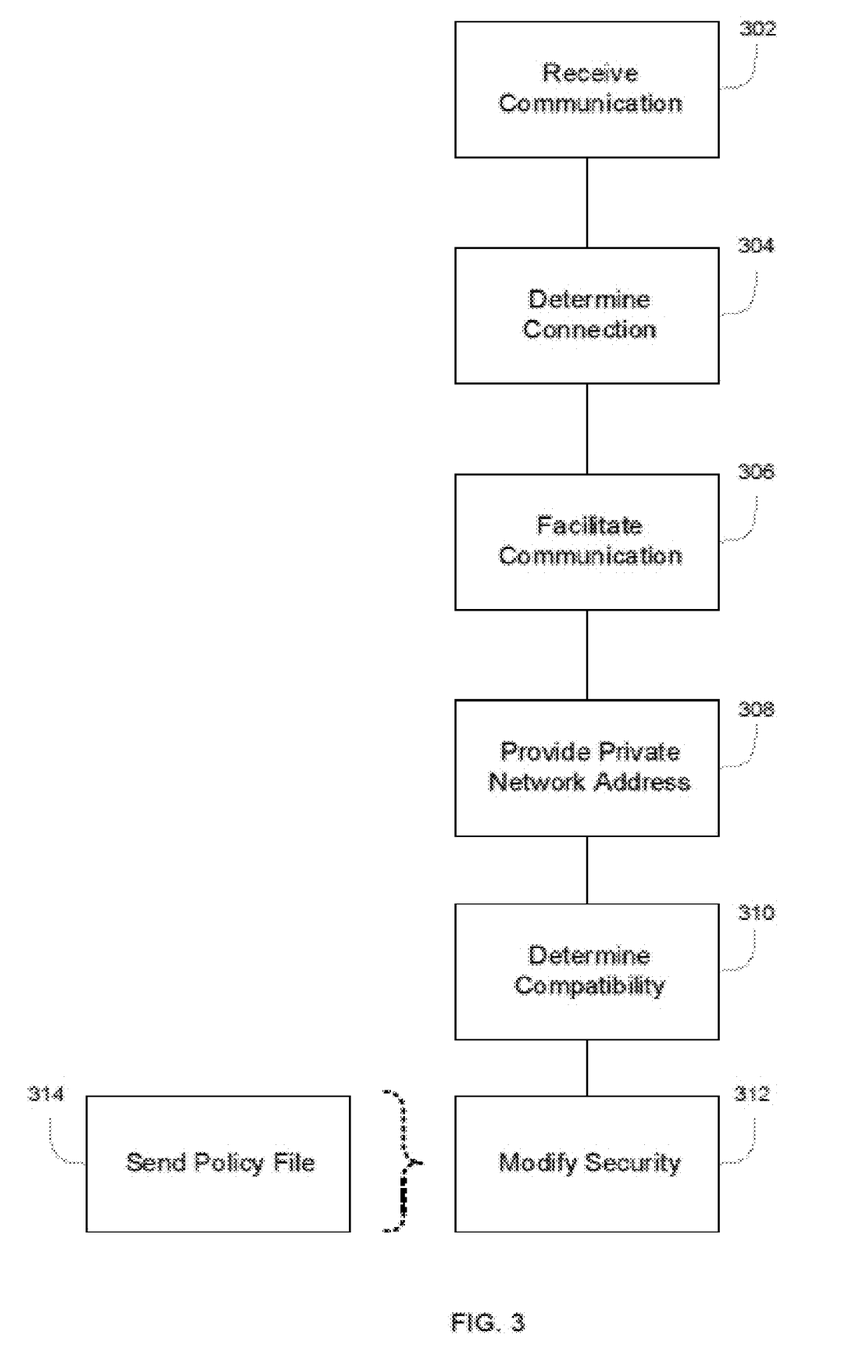
FIG. 3 is a flowchart depicting a method for use in connection with the present invention.

FIG. 3 shows a flowchart diagram that depicts a process for controlling content within a web browser. The process may be implemented as software executing on one or more devices. For example, the process may run on host device 12, endpoint devices 18, 20, server 34, or any combination thereof. The process may also be implemented on any other capable device or in any appropriate architecture.

In an embodiment, the content control process may operate to control content within a web browser. In a specific embodiment, the process may facilitate connectivity and communication between browser application 14 and application 22, and allow application 22 to control web browser content displayed by browser application 14. In one example, browser application 14 is a video game downloaded by a user. The video game runs as a browser application (e.g. a FLASH application) within web browser 16, and is subject to the security restrictions of the web browser. In the same example, application 22 running on endpoint device 18 is a game controller application downloaded by the user. The controller application acts as a game controller and allows the user to control and/or play the FLASH game. The user may wish to connect the game controller application to the video game so he or she can play. However, since the video game is executing within the security mechanisms of web browser 16, the controller application and the video game may not be able to discover and communicate with each other.

In order for the applications to communicate, server 34 (and/or address registration process 36) may receive 302 a communication from application 22, which is running on endpoint device 18. In one embodiment, application 22 may send the communication in order to register its addresses with server 34. Accordingly, the communication may include the private network address of endpoint device 18 (i.e. the private network address within private network 24), and may also include the public address of endpoint device 18. In this example, since network interface device 32 is the bridge between private network 24 and public network 30, the public and private network addresses of endpoint device 18 may match, at least in part, the public network address of network interface device 32.

In some cases, the communication may also contain an application ID. Application 22 may have an application ID that it sends to server 34 along with the public and private network addresses.

Browser application 14 (running within browser 16 on host device 12) may also send a communication to server 34. Similarly, the communication from browser application 14 may serve to register browser application 14 with address registration process 36. The communication may contain the public network address of host device 12, and may also contain an application ID that uniquely identifies browser application 14. In this case, as discussed above, the public network address of host device 12 may match, in whole or in part, the public network address of network interface device 32, since network interface 32 provides the interface between host device 12 and public network 30. In some embodiments, the communication from browser application 14 and/or from application 22 also contains other information, such as the private network address of host device 12, other information about host device 12, application data, user data, or any other type of information.

Figure 4:
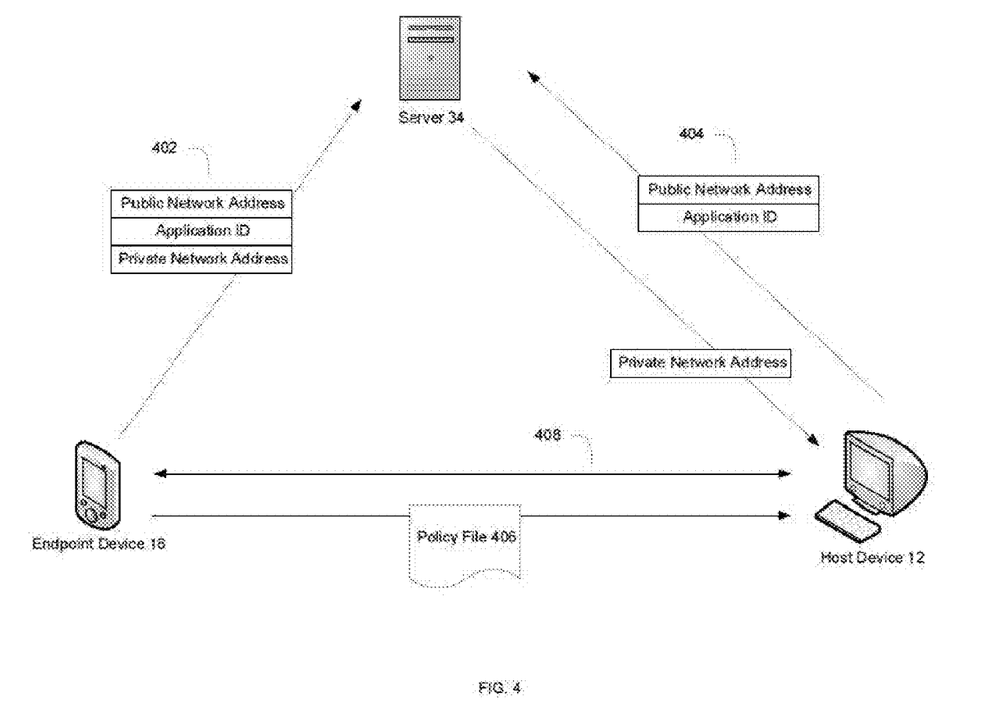
FIG. 4 is a block diagram illustrating some of the operations of the present invention.

FIG. 4 shows a an example of the communications between endpoint device 18, host device 12, and server 34. As shown, communication 402 includes the public and private network addresses of endpoint device 18, and an application ID of application 22. Similarly, communication 404 contains the public network address of host device 12 and the application ID of browser application 14. The opposite may also be true.

Server 34 may receive communications from other endpoint devices and host devices (not shown). In one embodiment, server 34 is an internet server that receives communications (include network addresses and application IDs) from devices connected to various private networks throughout cyberspace. Server 34 may record and catalog the information it receives from these various devices in, for example, a database or other data store.

Upon receipt of the communications, server 34 may determine 304 whether endpoint device 18 and host device 12 are connected to the same local network based upon the public network addresses within the communications. As described above, the public network address is typically associated with a public-facing device connected to the local network. In FIG.

1, that device is network interface device 32. Therefore, in this example, when server 34 receives communication 402 from endpoint device 18, the public network address may indicate that endpoint device 18 is connected to private network 24 since the communication is being routed through network interface device 32. Similarly, the public network address in communication 404 from host device 12 may indicate that host device 12 is connected to private network 24 and that communication 404 is being routed through network interface device 32.

By comparing the public network address of various devices in this way, server 34 can determine which devices are connected to the same private networks. The public network addresses may match, in whole or in part, or may otherwise be related. For example, server 34 may determine that two devices are connected to the same private network if the public network addresses of the two devices match. In another example, server 34 may determine that two devices are connected to the same private network if the public network addresses of the two devices have the same subnet address. Server 34 may also contain a lookup table or other device that provides information about which public network addresses are associated with various private networks. By utilizing the lookup table or other mechanism, server 34 may determine whether received public network addresses indicate that devices are connected to the same private network.

System 10 may also facilitate a network connection between browser application 14 and application 22 by providing 308 the private network address of endpoint device 18 to browser application 14. As discussed above, browser application 14 and application 22 may not be able to connect or communicate with each other if the security of web browser 16 prevents such communication. For example, the security of web browser 16 may prevent browser application 14 and from broadcasting its presence on private network 24. Similarly, the security of web browser 16 security may prevent browser application 14 from receiving broadcasts from application 22.

However, browser application 14 may be able to communicate directly with application 22 if browser application 14 knows the private network address of endpoint device 18. By providing the private network address of endpoint device 18 to browser application 14, the system may be able to modify the security policy of web browser 16 to allow communication between browser application 14 and application 22.

In some embodiments, address registration process 36 and/or server 34 will provide the private network address of endpoint device 18 to browser application 14 only if application 22 and browser application 14 are compatible applications. For example, if address registration process 36 determines 310 that browser application 14 is a game application and application 22 is a controller application for that game, then address registration process 36 may determine that application 22 and browser application 14 are compatible applications and send the private network address of endpoint device 18 to browser application 14, so that browser application 14 and application 22 can communicate with each other. However, if browser application 14 and application 22 are not compatible, then address registration process may not send the private network address to browser application 14. For example, if browser application 14 is a video game, but application 22 is an application for drawing pictures, then they are likely not compatible. In this case, there may be no need to send the private network address of endpoint device 18 to browser application 14 in order to initiate communication between browser application 14 and application 22.

Address registration process 36 may determine 310 whether applications are compatible in various ways. In one embodiment, address registration process 36 may compare the application IDs received from application 22 and browser application 14. If the application IDs indicate the applications are compatible, address registration process may provide 308 the private network address of endpoint device 18 to browser application 14. The application IDs may indicate the applications are compatible if the application IDs match, for example. In other embodiments, the application IDs may indicate compatibility if they are associated in some other way. For example, address registration process 36 may have a lookup table or hash table of application IDs that links compatible application IDs.

The application IDs may be any unique identifier and may include information such as a code representing the application and/or its version number, the name of the application, etc. The opposite may also be true.

In some embodiments, address registration process 36 may provide 308 the private network address to browser application 14 in various ways. In one embodiment, browser application 14 may periodically poll address registration process 36 and ask for the address. Upon receipt of the request, address registration process 36 may send browser application 14 a list of the private network addresses of all endpoint devices that are running compatible applications and connected to private network 24. In another embodiment, address registration process 36 may send the private network address of an endpoint device to browser application 14 whenever an endpoint device running a compatible application and connected to private network 24 registers with address registration process 36. In yet another embodiment, address registration process 36 may periodically broadcast lists of private network addresses, which can be retrieved by browser application 14 whenever appropriate. Other schemes of providing 308 the private network addresses to browser application 14 may also be employed.

If the security of web browser 16 prevents communication between browser application 14 and application 22, then the system may modify 312 the security policy of web browser 16 to allow for the communication. For example, endpoint device 18 may send 314 a policy file to host device 12.

Referring to FIGS. 3 and 4, in one embodiment, endpoint device 18 may send 314 policy file 406 to host device 12 by serving the policy file through a web server. Endpoint device 18 may execute a web server application, which may be incorporated into application 22, or may be a standalone or off-the-shelf web server application. Typical off-the-shelf web server applications include the Apache® web server, Microsoft IIS® web server, etc. One skilled in the art will recognize that other devices, such as endpoint device 20 or server 34, may also execute the web server application and send 314 the policy file 406 to host device 12.

Upon receipt of the private network address of endpoint device 18, browser application 14 may access the web server executing on endpoint device 18 and download policy file 406. Policy files are typically known in the art. In this example, policy file 406 may contain a new security policy for web browser 16 or changes to the security policy of web browser 16 that allow for communication between browser application 12 and application 22. When browser application 14 receives policy file 406, it may apply the policy file to the security policy of web browser 16 to allow for such communication.

In another embodiment, the security policy of web browser 16 may be modified 312 through an HTML5 handshake. HTML5 handshakes are also typically known in the art. In this case, application 22 and browser application 14 may perform the HTML5 handshake in order to modify the security profile of web browser 16 and allow communication between browser application 14 and application 22.

Once browser application 14 and application 22 establish network communication, they may initiate one way communication, two way communication, or both. For example, browser application 14 may send data and/or instructions to application 22, and vice versa. The data and/or instructions may be any type of data or instructions for communication between two applications. For example, the data and/or instructions may include loss tolerant data (such as an audio or video stream), loss sensitive data (such as command or control data), etc. The data and instructions may flow from application 22 to browser application 14, from browser application 14 to application 22, or both. In some embodiments, the data may include game data. For example, if web browser application 14 is a game and application 22 is a game controller application, web browser 14 may send data to application 22 that lets application 22 know what kind of game data and instructions are expected by browser application 14. In this way, browser application 14 and/or application 22 can customize the type of data sent back and forth.

Although the descriptions above provide examples with a single endpoint device, a single host device, and a single server, one skilled in the art will recognize that any combination employing single or multiple devices are possible. Any combination of single or multiple endpoint devices, single or multiple host devices, and/or single or multiple address registration server devices may fall within the scope of the invention. For example, multiple endpoint devices may connect to a single host device, a single endpoint device may connect to a single host device, single or multiple host and/or endpoint devices may communicate with single or multiple address registration server devices, etc. Other combinations are also within the scope of the invention.

Gaming Example

The following example shows one embodiment of the present invention. A video game application is used to illustrate the operation of the present invention.

In this example, a fictional Player wants to play a video game within a web browser and use his smart phone as a game controller to control the game. Host device 12 is already connected to private network 24, so Player opens web browser 16 and directs it to a web site that hosts his selected video game. The video game in this example is a FLASH browser application. When web browser 16 downloads the game application, it begins to execute the game within web browser 16. However, web browser 16 has a security policy that restricts the game from discovering other devices connected to private network 24, or from broadcasting its presence over private network 24. Therefore, certain operations may be needed before Player's smart phone can be used as a game controller.

Once the game loads, it sends a message and registers its presence with server 34. The message includes the public network address of host device 12 and the application ID of the game. The application ID lets server 34 know which game is running, and the public network address lets server 34 know that host device 12 is connected to private network 24

Next, Player picks up his smart phone (i.e. endpoint device 18) and downloads a game controller application for the game (i.e. application 22) from the internet. Player's smart phone is also connected to private network 24 and has received its own private network address. When Player loads the game controller application, it sends a communication to server 34 that contains the public and private network addresses of the smart phone, and the application ID of the game controller application. The application ID lets server 34 know which game controller application is running, and the public network address lets server 34 know that the smart phone is connected to private network 24.

After it receives the communications, server 34 may make a determination, based on the public network addresses and application IDs it received, that the game controller and game applications are compatible and that host device 12 and the smart phone are connected to the same local network. If server 34 makes such a determination, it may provide the private network address of the smart phone to the game application to facilitate communication between the game and the game controller applications.

If needed, the game application and/or the game controller application may then modify the security policy of the web browser in order to allow network communication between the applications. For example, the smart phone, or another device, may provide a policy file or initiate an HTML5 handshake to modify the security profile of web browser 16.

The game application and game controller application may then establish network communication with each other by, for example, opening one or more socket connections. Once the applications connect over the network, Player can use the game controller application running on his smart phone to control and play the game running within the web browser. The game controller and the game applications may then send data, including game control data, video data, audio data, button press data, accelerometer data, etc., back and forth between the game controller application and the game application.

Operation of the System and Method

The following example illustrates the operation of some embodiments of the present invention. Browser application 14 may be a browser application executing within web browser 16, which may be executing on host device 12. Browser application 14 sends a communication with the public network address of host device 12 to server 34.

Application 22 may be an application for communicating with and controlling content displayed by browser application 14, and may be executing on endpoint device 18. Application 22 may send a communication to server 34 with the public and private network addresses of endpoint device 18.

Server 34 may determine that application 22 and browser application 14 are compatible applications executing on devices connected to the same local network. If so, server 34 may send the private network address of endpoint 18 to browser application 14 to facilitate connectivity between the two.

Browser application 14 and application 22 may then communicate with each other over private network 24, and may modify the security policy of web browser 16 to allow for two-way communication between browser application 14 and application 22.

The present disclosure makes reference to various block diagrams and flowcharts. One skilled in the art will recognize that the order and configuration of components in the block diagrams and steps in the flowcharts are not limitations and are provided for illustration only. Various appropriate configurations of components and devices, and various orders and sequences of operation may fall within the scope of the claims.

While the invention has been described in connection with the specific embodiments thereof, it will be understood that it is capable of further modification. Furthermore, this application is intended to cover any variations, uses, or adaptations of the invention, including such departures from the present disclosure as come within known or customary practice in the art to which the invention pertains.

What is claimed is:

1. A method of connecting devices on a network comprising:
   receiving, by an address registration server, a communication from a host device including a public network address of the host device, and a communication from an endpoint device including a public network address and a private network address of the endpoint device;
   determining, by the address registration server, whether the host device and the endpoint device are connected to a single local area network based on the public network addresses of the host device and a public address of the endpoint device, and whether the host device and the are each executing a compatible application;
   facilitating a network connection between the endpoint device and the host device over the local area network by providing the private network address of the endpoint device to the host device if it is determined that the endpoint device and the host device are connected to the local area network and each executing a compatible application; and
   upon receiving the private network address, modifying a security policy of the host device to allow communication between the host device and the endpoint device over the local area network.

2. A method as set forth in claim 1, wherein, in the step of receiving, the communication from the endpoint device and the host device includes an application ID configured to identify an application running on the endpoint device, the host device, or both.

3. A method as set forth in claim 2, wherein the step of determining includes comparing the application ID received from the host device to the application ID received from the endpoint device.

4. A method as set forth in claim 1, further comprising:
   executing, by the host device, a browser application within a web browser; and
   executing, by the endpoint device, an application configured to control content in the browser application.

5. A method as set forth in claim 4, wherein executing the browser application includes executing one of:
   a flash application
   a unity application;
   a web script; and
   an HTML5 application.

6. A method set forth in claim 4, wherein the step of determining includes determining whether the browser application and the application configured to control content in the browser application are compatible applications.

7. A method as set forth in claim 4, wherein:
   executing the browser application includes executing a game application; and
   executing the application includes executing a game controller application.

8. A method as set forth in claim 4, wherein the step of modifying the security policy includes altering a security policy of the web browser to allow communication between the browser application and the application configured to control content in the browser application.

9. A method as set forth in claim 8, wherein the step of altering includes one of:
   sending, to the host device, a policy file configured to allow the application executing on the endpoint device to access the browser application through security mechanisms of the web browser; and
   executing, by the host device and the endpoint device, an HTML5 policy handshake.

10. A system for connecting devices on a network including program instructions stored on at least one memory, the system comprising:
    an endpoint device having a private network address and a public network address;
    a host device having a public network address; and
    an address registration server configured to facilitate a network connection between the endpoint device and the host device over a single local area network by providing the private network address of the endpoint device to the host device if it is determined that the endpoint device and the host device are each connected to the single local area network and each executing a compatible application; and
    an application executing on the endpoint device, the host device, or both, are configured to modify, upon receipt of the private network address by the host device, a security policy of the host device to allow communication between the endpoint device and the host device over the local area network.

11. A system as set forth in claim 10, wherein the host device and the endpoint each communicate an application ID configured to identify an application running on the endpoint device, the host device, or both.

12. A system as set forth in claim 11, wherein the address registration server is further configured to determine whether the endpoint device and the host device are each executing the compatible application based upon a comparison of the application ID received from the host device and the application ID received from the endpoint device.

13. A system as set forth in claim 10, wherein the host device is further configured to execute a browser application within a web browser.

14. A system as set forth in claim 13, wherein the endpoint device is further configured to execute an application designed to control content in the browser application.

15. A system as set forth in claim 13 wherein the browser application includes one of:
    a flash application
    a unity application;
    a web script; and
    an HTML5 application.

16. A system as set forth in claim 13 wherein the host device is further configured to execute a game application within the web browser and the endpoint device is further configured to execute a game controller application for controlling content within the game application.

17. A system as set forth in claim 14 wherein the host device, the endpoint device, or both, are further configured to modify a security policy of the web browser to allow communication between the browser application and the application configured to control content in the browser application.

18. A method as set forth in claim 17 wherein the host device, the endpoint device, or both, are further configure to modify the security policy by performing operations including one or more of:
    sending a policy file from the endpoint device to the host device, the policy file configured to allow the application executing on the endpoint device to access the browser application through security mechanisms of the web browser; and
    executing an HTML5 policy handshake.

* * * * *

UNITED STATES PATENT AND TRADEMARK OFFICE
CERTIFICATE OF CORRECTION

| | | |
|---|---|---|
| PATENT NO. | : 8,019,878 B1 | Page 1 of 1 |
| APPLICATION NO. | : 13/041313 | |
| DATED | : September 13, 2011 | |
| INVENTOR(S) | : Christopher Allen, Trevor Burton and Andrew Zupko | |

It is certified that error appears in the above-identified patent and that said Letters Patent is hereby corrected as shown below:

Col. 11, line 15, claim 1: insert --endpoint device-- immediately after "whether the host device and the".

Signed and Sealed this
Third Day of January, 2012

David J. Kappos
*Director of the United States Patent and Trademark Office*